United States Patent [19]

Katayama et al.

[11] Patent Number: 5,164,172
[45] Date of Patent: Nov. 17, 1992

[54] PROCESS FOR PRODUCING ARAGONITE CRYSTAL FORM CALCIUM CARBONATE WITH ACICULAR SHAPE

[75] Inventors: Hiroaki Katayama, Himeji; Hiroshi Shibata, Akashi; Toshio Fujiwara, Himeji, all of Japan

[73] Assignee: Maruo Calcium Company Limited, Asaki, Japan

[21] Appl. No.: 762,161

[22] Filed: Sep. 20, 1991

Related U.S. Application Data

[63] Continuation of Ser. No. 541,998, Jun. 22, 1990, abandoned.

[30] Foreign Application Priority Data

Jun. 29, 1989 [JP] Japan .................................. 1-167267

[51] Int. Cl.$^5$ .............................................. C01F 5/24
[52] U.S. Cl. ...................................... 423/432; 423/430
[58] Field of Search ........................ 423/400, 432, 430

[56] References Cited

U.S. PATENT DOCUMENTS 4,824,654  4/1989  Ota et al. .............................. 423/432

FOREIGN PATENT DOCUMENTS 8036924   8/1981  Japan .................................. 423/430
0090820A  10/1983 Japan .................................. 423/430

Primary Examiner—Gary P. Straub
Attorney, Agent, or Firm—Armstrong & Kubovcik

[57] ABSTRACT

Disclosed is a process for producing aragonite crystal form calcium carbonate with an acicular shape characterized by premixing aragonite crystal calcium carbonate and $Ca(OH)_2$ to prepare an aqueous slurry, adding a water-soluble phosphoric acid compound into the aqueous slurry, and introducing $CO_2$ gas into the aqueous slurry to cause the carbonation reaction to take place. According to the present invention, aragonite crystal form calcium carbonate in an acicular shape with a large particle size is produced.

10 Claims, 1 Drawing Sheet

PROCESS FOR PRODUCING ARAGONITE CRYSTAL FORM CALCIUM CARBONATE WITH ACICULAR SHAPE

This application is a continuation of application Ser. No. 541,998 filed Jun. 22, 1990, now abandoned.

BACKGROUND OF THE INVENTION

1. Field of the Invention

The present invention relates to a process for producing aragonite crystal form calcium carbonate with a large particle size and an acicular shape (Hereinafter referred to as "aragonite calcium carbonate").

2. Description of Prior Art

Aragonite crystal form calcium carbonate (hereinafter referred to as "aragonite" or "aragonite calcium carbonate") is superior in dispersibility of particles to calcite crystal form calcium carbonate (hereinafter referred to as "calcite" or "calcite calcium carbonate"). Furthermore, a cylindrical crystal habit of aragonite which does not exist in the calcite, shows various characteristics which are not expected in the calcite. Therefore, more effective industrial production of aragonite have been attempted up to now. But, aragonite prepared by each of those processes is almost fine acicular shape (nearly 0.5–3.0 $\mu$m in a long diameter, 0.1–0.7 $\mu$m in a short diameter) and have been utilized on the surface of coated paper to improve its printability. For example, as the prior art for gas-liquid reaction of $Ca(OH)_2$ slurry and $CO_2$ gas, a process for regulating an amount of $CO_2$ gas stepwise in the carbonation step is proposed (Japanese Patent Publication No. Sho 55-51852,) and a process for adding in advance a crystal nucleus formation agent into Ca$(OH)_2$ slurry is disclosed (Japanese Patent Laid Open No. Sho 59-223225).

On the one hand, a production of a larger acicular aragonite has been expected to develop the various industrial use. Although processes forming larger acicular-shaped aragonite are disclosed in Japanese Patent Laid Open No. Sho 62-278123, Japanese Patent Laid Open No. Sho 62-27325 etc., these processes have extremely less production efficiency because of forming from a water-saturated solution of calcium hydroxide (A solubility of $Ca(OH)_2$ is 0.185 g per 100 g of water at 0° C.) and hence are extremely inadequate as processes on a industrial scale. And in Japanese Patent Laid Open No. Sho 58-36924, a process for growing particles by the carbonation within a range of 1–5 in molar ratio of aragonite calcium carbonate to calcium hydroxide is disclosed. However, a particles size of aragonite calcium carbonate prepared in the manner as stated above has at most 1.4–4.5 $\mu$m in a long diameter and 0.12–0.6 $\mu$m in a short diameter, and it is apt to change into almost calcite type when increasing the above molar ratio for larger particle size.

As mentioned above, it is the present state that a process for commercially producing aragonite calcium carbonate with an acicular shape having a large particle size, namely 10–100 $\mu$m level in a long diameter, has not yet been established.

SUMMARY OF THE INVENTION

It is an object of the present invention to provide a process for producing aragonite calcium carbonate with a large particle size in an acicular shape, more efficiently on an industrial scale.

It is another object of the present invention to provide a process for producing aragonite calcium carbonate in an acicular shape with a larger particle size than ever before on an industrial scale.

Other objects and advantages of the present invention will become apparent to those having ordinary skill in the art from the detailed description that follows.

The present inventors have made an extensive series of studies in an ardent desire to accomplish the above object and have found that it can be attained by preparing an aqueous slurry comprising aragonite calcium carbonate and $Ca(OH)_2$, then adding a water-soluble phosphoric acid compound to cause the carbonation reaction to proceed.

DETAILED DESCRIPTION OF THE INVENTION

Figure 1:
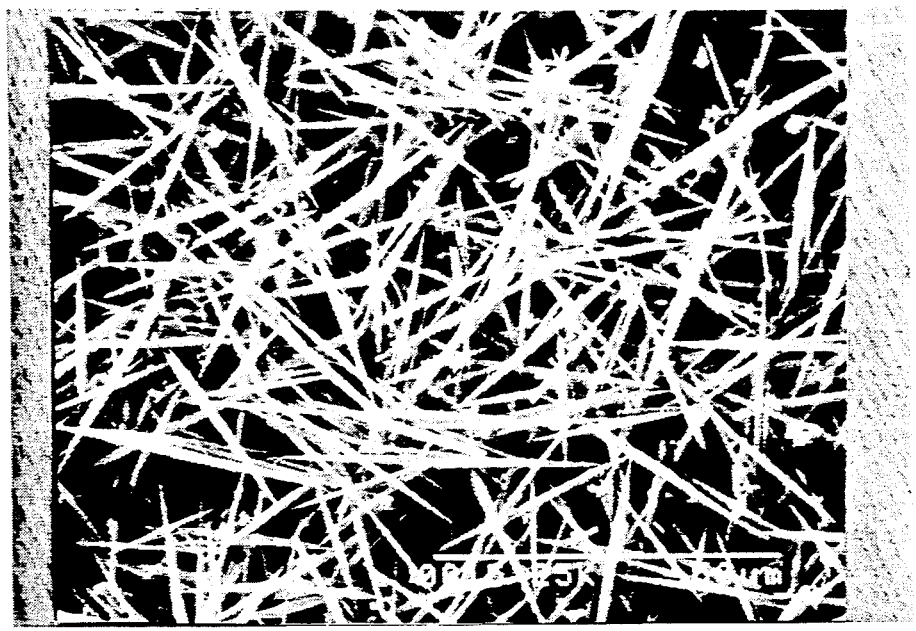
FIG. 1 is a microphotograph showing a crystal structure of aragonite calcium carbonate obtained in Example 2.
Figure 2:
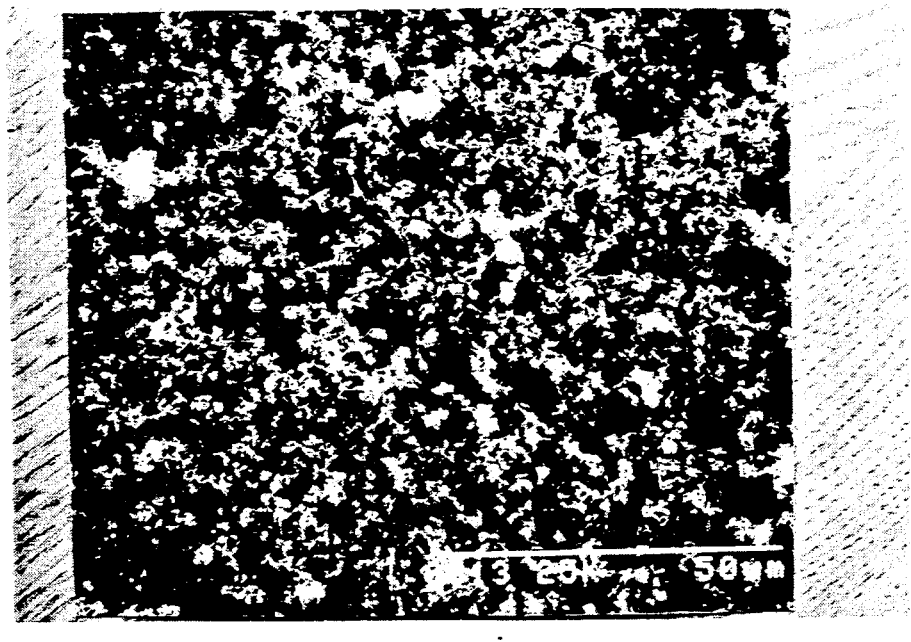
FIG. 2 is a microphotograph showing a crystal structure of aragonite calcium carbonate used generally for the conventional coated paper.

The present invention encompasses a process for producing aragonite calcium carbonate with an acicular shape characterised by premixing aragonite calcium carbonate and $Ca(OH)_2$ to prepare an aqueous slurry, adding a water-soluble phosphoric acid compound into the aqueous slurry, and introducing $CO_2$ gas into the aqueous slurry to cause the carbonation reaction to take place.

In the present invention, aragonite calcium carbonate with an acicular shape to be premixed into an aqueous slurry of $Ca(OH)_2$ is preferable to be in a particle size of 0.5–10.0 $\mu$m in a long diameter and 0.1–1.0 $\mu$m in a short diameter, and those formed by the processes disclosed by, for example, Japanese Patent Laid Open No. Sho 63-256514, 63-260815, etc., can be used, though not limited thereto, specifically.

A molar ratio of the aragonite calcium carbonate to $Ca(OH)_2$ slurry is preferable 1:7–1:5000 finally. More preferable is 1:10–1:2000. When the molar ratio is less than 1:7, it is difficult to get large particles the present invention intends, and when it is more than 1:5000, fine particles are included therein, and productive efficiency decreases because of lengthened reaction time. In such a case, the repeated several mixing of the aragonite calcium carbonate and $Ca(OH)_2$ slurry and carrying out the reactions is better than once for more homogeneous particles. In dividing into several reactions, for example, if, firstly, mixing aragonite calcium carbonate and $Ca(OH)_2$ slurry at the molar ratio of 1:10 and introducing $CO_2$ gas to thus complete the carbonation reaction, then conducting and next reaction in a similar way by mixing the obtained aragonite calcium carbonate slurry and $Ca(OH)_2$ slurry at the molar ratio of 1:10, the molar ratio of the original aragonite calcium carbonate and $Ca(OH)_2$ slurry is calculated as 1:100 finally. Furthermore, if reacting the obtained aragonite calcium carbonate slurry with $Ca(OH)_2$ slurry at the molar ratio of 1:10, namely, repeating the carbonation reactions three times, the final ratio is 1:1000. In this case, a water-soluble phosphoric acid compound must be added for each reaction. Though such operation can be also repeated four times or five times, it is preferable that the carbonation reactions are limited within three times in view of productive efficiency. In repeating mixing and reaction, several times, of aragonite calcium carbonate and Ca(OH)$_2$ slurry, for example, giving three times, the mixed proportion of the both per once in molar ratio of aragonite calcium carbonate: Ca(OH)$_2$ is preferably 1:3 to 1:18, more preferably 1:3 to 1:13.

The concentration of slurry mixed aragonite calcium carbonate and Ca(OH)$_2$ is preferably 30–250 g/l, more preferably 100–230 g/l.

As a water-soluble phosphoric acid compound usable in the present invention, phosphoric acid and sodium salt, potassium salt, ammonium salt, etc., of phosphoric acid are included, these compounds are used singly or in combination of two or more. As these phosphoric acid salts, $K_3PO_4$, $KH_2PO_4$, $K_2HPO_4$, $Na_2HPO_4$, $.12H_2O$, $(NH_4)_3PO_4$, $.3H_2O$, etc., are shown. The level of solubility is preferably not less than 0.1 g per 100 cc of water at a temperature of 20° C., more preferably, not less than 5.0 g per 100 cc of water at a temperature of 20° C. The amount added of a water-soluble phosphoric acid compound is preferably 0.1 to 15% by weight, more preferably 0.3–5.0% by weight based on Ca(OH)$_2$.

The temperature of the carbonation is preferably 20°–80° C., more preferably 35°–70° C. The more preferably 35°–70° C. The amount introduced of CO$_2$ gas as 100% CO$_2$ is preferably not more than 4 l/min/kg-.Ca(OH)$_2$, more preferably not more than 2 l/min/kg-.Ca(OH)$_2$.

According to the process as stated above, aragonite calcium carbonate with a large particle size, namely 10–100 μm in a long diameter and 0.5–4.0 μm in a short diameter can be produced.

As for regulating the particle size of the aragonite calcium carbonate, within a constant limit, the more the molar ratio of Ca(OH)$_2$ to aragonite calcium carbonate as a starting material, the larger the long diameter and the short diameter of formed particles.

A process for increasing the particle size of the original aragonite calcium carbonate by the carbonation of the mixed slurry of aragonite calcium carbonate and Ca(OH)$_2$ is proposed as stated earlier by Japanese Patent Laid Open No. Sho 58-36924. This proposed technology and the present invention both aim at growing the particle size by conducting further carbonation on the surface of the original aragonite calcium carbonate. However, the molar ratio of aragonite calcium carbonate to calcium hydroxide in the Japanese Patent Laid Open No. Sho 58-36924 is within a range of from 1–5. At this level of the molar ratio, the carbonation is sufficient to proceed on the surface of the original aragonite calcium carbonate even without adding a soluble phosphoric acid compound to the mixed slurry and then the growth of the particle is attained. But, its particle size is at largest 4.5 μm in a longer diameter. In contrast, in case where the molar ratio of the both is 1:7–1:5000, the carbonation can not proceed on the surface of the original aragonite calcium carbonate without adding a water-soluble phosphoric acid compound. More concretely, it only results in the formation of new aragonite fine particles or the formation of calcite calcium carbonate. It is not until adding the phosphoric acid compound that the carbonation proceeds on the surface of the original aragonite calcium carbonate to enable it grow thereon.

Meanwhile, a process for forming aragonite by adding a water-soluble phosphoric acid compound is described in Japanese Patent Laid Open No. Sho 63-25614. The formation mechanism of aragonite in this case, as described in offical patent gazette specification, is that phosphoric acid calcium is formed by adding a soluble phosphoric acid compound in the reaction system of aqueous slurry of Ca(OH)$_2$ and CO$_2$ gas, and then epitaxy is formed as a crystal nucleus. That is, the soluble phosphoric acid compound plays a role in forming phosphoric acid calcium as new aragonite crystal nucleus where aragonite crystal grows.

On the other hand, in the present invention a soluble phosphoric compound is added for the growth of crystal of aragonite calcium carbonate, and hence a role performed by the soluble phosphoric acid compound is different from the former. Considering the formation mechanism in Japanese Patent Laid Open No. Sho 63-256514, it is supposed that adding a soluble phosphoric acid compound does not grow aragonite crystal, on the contrary, forms new crystal nucleus to result in the formation of new fine aragonite crystals. But, the present inventors challenged to add the soluble phosphoric acid compound to an aqueous slurry of aragonite calcium carbonate and Ca(OH)$_2$ and found that aragonite crystal grew unexpectedly thereby.

The acicular-shaped aragonite calcium carbonate of the present invention is especially used for plastics, paper making, heat insulating material, etc. In plastics, an effect of imparting rigidity as a filler to polypropylene, in particular, is remarkable. Though conventional fillers imparting rigidity to polypropylene are talc, wollastonite and glass fiber, etc., talc and wollastonite are bad in whiteness owing to natural resources and are inferior in impact strength for irregular particle size and inclusion of coarse particles. Glass fiber is good in rigidity but bad in surface smoothness and it also includes problems on workability, labor hygiene and cost, etc. The aragonite calcium carbonate obtained by the present invention is to provide a new material solving these problems. For paper making, the use of such large acicular particles as a filler can provide inorganic paper mixing a greater amount of an inorganic material into pulp (pulp to inorganic material is up to approximately 1/9). In conventional small acicular-shaped calcium carbonate, it cnanot be stayed efficiently into pulp during paper making and its content can not be raised. Such an inorganic material paper can be applied for indoor interiors, etc. as an incombustible paper. The aragonite calcium carbonate of the present invention has such a peculiar acicular shape that there are formed sufficient spaces between particles and thus it can be used preferably for heat insulating materials and filter materials, etc. Furthermore, it can be used as a thickener for various pastes, sealing materials and paints, etc. It is considered that thixotropy coming from the acicular shape can be provided in these fields.

The invention will be described in more detail with reference to the following examples and comparative example, but the invention is in no way limited thereby.

EXAMPLE 1

Aragonite calcium carbonate with an acicular shape of 3 μm in a long diameter and 0.3 μm in a short diameter and calcium hydroxide were mixed at the molar ratio of CaCO$_3$/Ca(OH)$_2$ being 1/15, so that an aqueous slurry had a concentration of 150 g/l after mixing of them. Phosphoric acid in an amount of 2.0% by weight to Ca(OH)$_2$ was added into the aqueous slurry. After adjusting the slurry temperature to 50° C., the carbonation reaction was carried out with introducing CO$_2$ gas (as 100% purity) at a flow rate of 1 l/min/kg.Ca(OH)$_2$ into 30 l of the slurry. The concentration of $CO_2$ gas was 30% in this case.

EXAMPLE 2

Except that the mixed molar ratio of $CaCO_3$/$Ca(OH)_2$ was changed to 1/30, all were operated in the same manner as in Example 1. The crystal structure of the obtained aragonite calcium carbonate was shown in FIG. 1.

EXAMPLE 3

The aragonite calcium carbonite with an acicular shape of 20 μm in the mean long diameter and 1.0 μm in the mean short diameter formed in Example 1 and $Ca(OH)_2$ were mixed at the molar ratio of 1/15, and the carbonation reaction was completed in the same conditions as in Example 1.

EXAMPLE 4

Except that the mixed molar ratio of $CaCO_3$/$Ca(OH)_2$ was changed to 1/7, all were operated in the same manner as in Example 1.

EXAMPLE 5

Except that the mixed molar ratio of $CaCO_3$/$Ca(OH)_2$ was changed to 1/10, all were operated in the same manner as in Example 1.

EXAMPLE 6

Except that the mixed molar ratio of $CaCO_3$/$Ca(OH)_2$ was changed to 1/100, all were operated in the same manner as in Example 1.

EXAMPLE 7

Except that the mixed molar ratio of the aragonite calcium carbonate with an acicular shape of 15 μm in the mean long diameter and 0.9 μm in the mean short diameter formed in Example 5 and $Ca(OH)_2$ was adjusted to 1/10 in the mixed molar ratio, all were operated in the manner as in Example 1.

EXAMPLE 8

Except that the mixed molar ratio of the aragonite calcium carbonate with an acicular shape of 50 μm in the mean long diameter and 1.8 μm in the mean short diameter formed in Example 3 and $Ca(OH)_2$ was adjusted to 1/15 in the mixed molar ratio, all were operated in the manner as in Example 1.

EXAMPLE 9

Except that the mixed molar ratio of $CaCO_3$/$Ca(OH)_2$ was changed to 1/6, all were operated in the manner as in Example 1.

EXAMPLE 10

The aragonite calcium carbonate with an acicular shape of 50 μm in the mean long diameter and 1.8 μm in the means short diameter formed in Example 3 and $Ca(OH)_2$ were mixed at the molar ratio of 1/25, and the carbonation reaction was completed in the same conditions as in Example 1.

COMPARATIVE EXAMPLE 1

Except that the phosphoric acid was not added into the mixed slurry in Example 1, all were operated in the same manner as in Example 1.

Particle shapes of the aragonite calcium carbonate formed in Examples and Comparative Example were shown in Table 1.

TABLE 1

| | |
|---|---|
| Example 1 | Aragonite calcium carbonate with an acicular shape of 20 μm in the mean long diameter and 1.0 μm in the mean short diameter. |
| Example 2 | Aragonite calcium carbonate with an acicular shape of 30 μm in the mean long diameter and 1.5 μm in the mean short diameter. |
| Example 3 | Aragonite calcium carbonate with an acicular shape of 50 μm in the mean long diameter and 1.8 μm in the mean short diameter. |
| Example 4 | Aragonite calcium carbonate with an acicular shape of 10 μm in the mean long diameter and 0.8 μm in the mean short diameter. |
| Example 5 | Aragonite calcium carbonate with an acicular shape of 15 μm in the mean long diameter and 0.9 μm in the mean short diameter. |
| Example 6 | Having 40 μm in the mean long diameter and 1.7 μm in the mean short diameter, fine acicular shape aragonite is included and the particle size is slightly irregular. |
| Example 7 | Aragonite calcium carbonate with an uniform acicular shape of 40 μm in the mean long diameter and 1.7 μm in the mean short diameter. |
| Example 8 | Aragonite calcium carbonate with an acicular shape of 70 μm in the mean long diameter and 2.0 μm in the mean short diameter. |
| Example 9 | Aragonite calcium carbonate with an acicular shape of 8 μm in the mean long diameter and 0.7 μm in the mean short diameter. |
| Example 10 | Having 80 μm in the mean long diameter and 2.0 μm in the mean short diameter, fine acicular shape aragonite is included and the particle size is slightly irregular. |
| Comparative Example 1 | Calcite type calcium carbonate with an almost fusiform shape. |

By the comparison of Examples 4, 5, 1 and 6, it is to be understood that the more $Ca(OH)_2$ in the mixed molar ratio of $CaCO_3$/$Ca(OH)_2$, the larger the particle size of the obtained aragonite clacium carbonate. Also, comparting Examples 6 and 7, it is to be understood that more uniform particle size can be formed by two-step reaction.

Application Example

The aragonite calcium carbonate formed in Example 2 was blended with a polypropylene resin in the manner described below and the strength property was measured.

(1) Test method

| Blending ratio: | |
|---|---|
| Polypropylene resin (trade name MA-3, manufactured by Mitsubishi Yuka) | 100 parts by weight |
| Aragonite calcium carbonate | 30 parts by weight |

After kneading at this blending ratio and pelletizing, the strength property was measured by using a test piece obtained by injection molding.

As comparative materials, talc (manufactured by Fuji Talc, PKS-100) used widely as a filler for polypropylene resin, and heavy calcium carbonate (manufactured by Maruo Calcium Co., Super 3S) were used and the same operation was carried out. The results were shown in Table 2.

TABLE 2

| | Aragonite calcium carbonate of Example 2 | Talc | Heavy calcium carbonate |
|---|---|---|---|
| Bending strength (kg/cm$^2$) | 510 | 530 | 420 |
| Bonding elastic modulus (kg/cm$^2$) | 37500 | 32200 | 19500 |
| Izod impact strength (kg · cm/cm$^2$) (at 20° C.) | 10.1 | 5.3 | 7.9 |

From the above results, it is to be understood that when the aragonite calcium carbonate of the present invention is blended with a polypropylene resin, an excellent strength property is obtained. The conventional filler, for example, talc has a high bending elastic modulus but a low Izod impact strength, so that both properties can not be maintained. However, the aragonite calcium carbonate of the present invention can give a good balance for both properties. It is also expected to improve properties further by surface treatment with a substance having a good compatibility with the polypropylene resin.

What is claimed is:

1. A process for producing acicular aragonite calcium carbonate crystal, comprising premixing aragonite crystal form calcium carbonate having an acicular shape and Ca(OH)$_2$ in a molar ratio of 1:7 to 1:5000 to prepare an aqueous slurry, adding at least one compound selected from the group consisting of phosphoric acid (H3PO4) and water-soluble salts thereof into the aqueous slurry, and introducing CO$_2$ gas into the aqueous slurry to cause a carbonation reaction to take place thereby producing aragonite crystal form calcium carbonate having an acicular shape, which has a particle size of 10 to 100 μm by 0.5 to 4.0 μm, which is larger than the aragonite crystal form calcium carbonate which is premixed with Ca(OH)$_2$ to form said aqueous slurry.

2. The process of claim 1, wherein the aragonite crystal form calcium carbonate is premixed with the Ca(OH)$_2$ in a molar ratio of 1:10–1:2000.

3. The process of claim 1, wherein the aragonite crystal form calcium carbonate that is premixed with the Ca(OH)$_2$ to form an aqueous slurry has an acicular shape and a particle size of 0.5–10.0 μm in a long diameter and 0.1–1.0 μm in a short diameter.

4. The process of claim 1, wherein produced aragonite crystal form calcium carbonate is used as seed in a second carbonization reaction.

5. The process of claim 4, wherein the aragonite crystal form calcium carbonate that is premixed with the Ca(OH)$_2$ to form an aqueous slurry has an acicular shape and a particle size of 5–50 μm in a long diameter and 0.5–4.0 μm in a short diameter.

6. The process of claim 1 or 4, wherein a concentration of a mixed slurry of the aragonite crystal form calcium carbonate and the Ca(OH)$_2$ is 30–250 g/l.

7. The process of claim 1 or 4, wherein an introduction amount of CO$_2$ gas as 100% CO$_2$ is not more than 4 l/min/kg.Ca(OH)$_2$.

8. The process of claim 1 or 4, wherein the carbonation reaction is carried out at a temperature of 20°–80° C.

9. The process of claim 1, wherein the amount of the phosphoric acid or water-soluble salt thereof added is 0.1–15% by weight based on the Ca(OH)$_2$.

10. The process of claim 1 or 9, wherein the water-soluble salts of phosphoric acid are selected from the group consisting of K$_3$PO$_4$, KH$_2$PO$_4$, K$_2$HPO$_4$, Na$_2$HPO$_4$, .12H$_2$O and (NH$_4$)$_3$PO$_4$, .3H$_2$O.

* * * * *